(12) United States Patent
Prusinski et al.

(10) Patent No.: US 7,360,361 B2
(45) Date of Patent: Apr. 22, 2008

(54) TURBOCHARGER

(75) Inventors: Thomas M. Prusinski, Carpinteria, CA (US); Peter Hofbauer, West Bloomfield, MI (US); Jason Schmidt, Paso Robles, CA (US)

(73) Assignee: Advanced Propulsion Technologies, Inc., Goleta, CA (US)

( * ) Notice: Subject to any disclaimer, the term of this patent is extended or adjusted under 35 U.S.C. 154(b) by 60 days.

(21) Appl. No.: 11/399,775

(22) Filed: Apr. 7, 2006

(65) Prior Publication Data

US 2006/0225419 A1 Oct. 12, 2006

Related U.S. Application Data

(60) Provisional application No. 60/669,598, filed on Apr. 9, 2005.

(51) Int. Cl.
*F02B 33/44* (2006.01)
*F01M 1/00* (2006.01)

(52) U.S. Cl. .................. 60/608; 60/605.3; 60/602; 184/6.16; 184/6.11; 184/6.18; 417/406; 417/407; 417/409

(58) Field of Classification Search ............... 60/605.3, 60/602, 608; 417/406, 407, 409; 184/6.16, 184/6.11, 6.18
See application file for complete search history.

(56) References Cited

U.S. PATENT DOCUMENTS

| | | | | |
|---|---|---|---|---|
| 1,428,925 A | * | 9/1922 | Thomas | 60/602 |
| 2,234,777 A | * | 3/1941 | Puffer | 184/6.16 |
| 2,296,703 A | * | 9/1942 | Butler et al. | 184/6.16 |
| 2,646,210 A | * | 7/1953 | Kohlmann et al. | 417/407 |
| 2,702,093 A | * | 2/1955 | Sherrill | 184/6.11 |
| 3,382,670 A | | 5/1968 | Venable | |
| 3,687,233 A | * | 8/1972 | Greenwald | 184/6.18 |
| 3,895,620 A | | 7/1975 | Foster | |
| 4,009,972 A | | 3/1977 | Sarle | |
| 4,235,484 A | * | 11/1980 | Owen et al. | 184/6.11 |
| 4,253,031 A | * | 2/1981 | Frister | 417/407 |
| 4,364,717 A | * | 12/1982 | Schippers et al. | 417/407 |
| 4,525,995 A | | 7/1985 | Clark | |
| 5,605,045 A | | 2/1997 | Halimi et al. | |
| 6,050,780 A | | 4/2000 | Hasegawa et al. | |
| 6,102,672 A | * | 8/2000 | Woollenweber et al. | 417/366 |
| 6,257,834 B1 | * | 7/2001 | Bremer et al. | 417/406 |
| 6,609,375 B2 | * | 8/2003 | Allen et al. | 60/608 |
| 7,056,103 B2 | * | 6/2006 | LaRue | 417/407 |

* cited by examiner

*Primary Examiner*—Thomas Denion
*Assistant Examiner*—Mary A Davis
(74) *Attorney, Agent, or Firm*—Paul K. Godwin, P.C.

(57) ABSTRACT

An electrically controlled turbocharger having a substantially vertically oriented shaft interconnecting a turbine and a compressor. The vertical orientation serves to eliminate the effects of gravity on the rotating components. Placing the turbine vertically above the motor and compressor and provides additional cooling through convection of heat produced by hot exhaust gas flowing through the turbine. A lubricating system utilizes scavenged air from the compressor to draw lubricating oil through internal passages of the motor housing to maintain a desirable oil sump level, ventilate the auxiliary induction motor, and provide pressure to the oil seals of the motor cavity.

6 Claims, 6 Drawing Sheets

TURBOCHARGER

RELATED APPLICATION

This application and the claimed subject matter is supported by Applicant's provisional application Ser. No. 60/669,598 to TURBOCHARGER, filed Apr. 9, 2005 and the benefit to priority of that date is hereby claimed.

BACKGROUND

1. Field of the Invention

The invention relates to the field of turbochargers for use with internal combustion engines. More specifically the invention relates to specific improvements in a lubrication system for a turbocharger as well as the construction of an electrically controlled turbocharger.

2. Description of the Prior Art

Turbochargers are frequently employed in association with internal combustion engines to improve engine response under varying loads. Electrically assisted turbochargers provide the added advantage of, reducing transient lag, reducing fuel consumption and lowering emission levels. Typically, an electrically assisted turbocharger employs a motor engaged to supply supplemental power to rotate the shaft that extends between the turbine and the compressor. When the engine requires increased demand for intake air and the turbine is not turning at a fast enough speed to provide the demand, the motor is powered to drive the turbine and compressor at a sufficient speed to supply the required air.

Such turbochargers described in the prior art are commonly structured so that the turbine, motor and compressor are mounted on a horizontal shaft. Additionally, the electric motors employed in prior art turbochargers contain magnets that become degraded due to exposure to the extreme heat inherent in such applications.

SUMMARY OF THE INVENTION

The present invention provides several improvements to an electrically controlled turbocharger unit that result in lower vibration, cooler running temperatures and increased reliability. Such improvements are the result of orienting the unit so that the central shaft containing the turbine and the compressor is mounted to rotate on a substantially vertical axis. This orientation results in the elimination of gravitational effects on the rotating shaft and the elements mounted thereon. In addition, an induction motor having its rotor integrally mounted on the shaft that extends between the turbine and the compressor is found to provide highly responsive characteristics and greater endurance to the high temperatures inherent in turbochargers. Further, an improved lubricating system is described to enhance the flow of lubricating fluid through the turbocharger housing and the various bearings in the unit by utilizing air pressure scavenged from the compressor and injected into upper and lower oil reservoirs.

It is an object of the present invention to provide a vertically oriented turbocharger that reduces and therefore improves the vibration characteristics of the turbo shaft at high speed rotations.

It is another object of the present invention to provide an improved electrically controlled turbocharger that utilizes an induction motor for driving the compressor when exhaust gas flow from the associated internal combustion engine is insufficient to provide the necessary drive power.

It is a further object of the invention to provide an improved lubricating system for vertically oriented turbochargers that is effective to provide lubricating fluid to the vertically spaced shaft bearings.

It is a still further object of the present invention to provide improved cooling for an electrically controlled turbocharger through the use of air scavenged from the compressor and ducted into the motor and lubricating system that circulates lubricating fluid through the housing of the turbocharger.

DETAILED DESCRIPTION OF THE INVENTION

Figure 1:
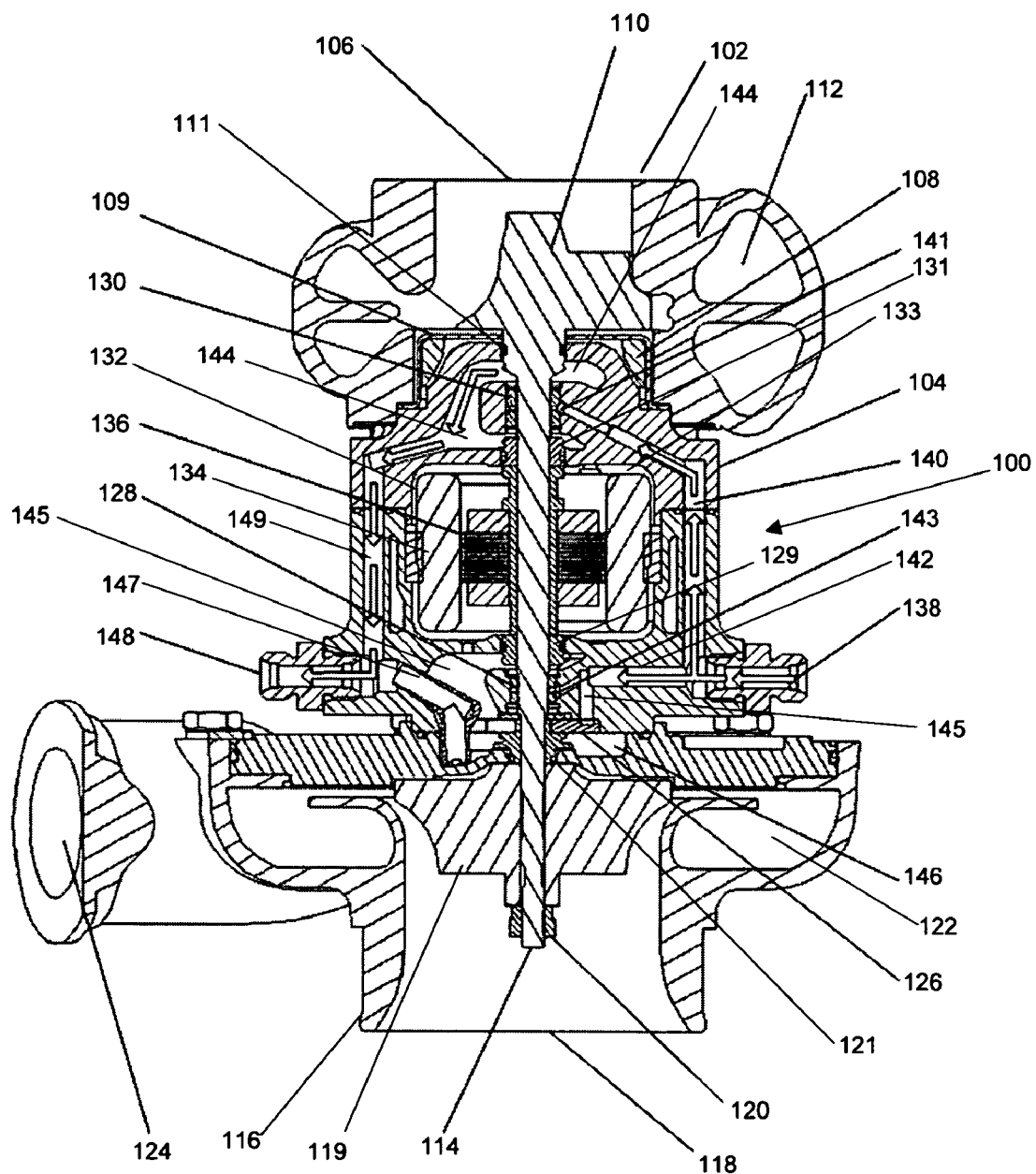
FIG. 1 is a cross-sectional plan view of the preferred embodiment of the present invention taken along section line B-B in the top view diagram of FIG. 6.

In FIG. 1, the preferred embodiment of an electrically assisted turbocharger unit 100 is depicted in a substantially vertical orientation, intended to be mounted on or in close proximity to an associated internal combustion engine.

In this embodiment, a turbine housing 102 in shown in the upper portion of FIG. 1, while a compressor housing 116 is shown in the lower portion. A motor housing 104 is shown as being intermediate the turbine and compressor housings.

A turbocharger shaft 114 is at the core of the unit and provides the mechanical drive connection between an exhaust gas turbine rotor 110 and a compressor rotor 119. In this case an induction motor 132 is provided in motor housing 104 to surround shaft 114 and a motor rotor 136. Motor rotor 136 is fixedly mounted on shaft 114 to be integral therewith.

Turbine housing 102 provides an exhaust gas inlet port 106 that is connected to the exhaust manifold of an associated engine (not shown). Turbine housing 102 contains exhaust gas turbine rotor 110 and a volute 112 through which forced exhaust gas passes. Exhaust gas turbine rotor 110 is shown, in this embodiment, as being integrally forged to shaft 114.

An upper heat shield 109 and an insulation layer 108 are respectively provided between motor housing 104 and turbine housing 102 to resist the conduction of heat from the exhaust gas down to motor housing 104 and all the associated components that may be affected by such temperatures. Since convection heat tends to rise, some of the heat from exhaust gases is dissipated upwards from turbine housing 102 and away from motor housing 104. In doing so, the rising air caused by the convection heat draws air upwards from below and helps cool the unit. The vertical stacking of the components takes advantage of this phenomenon.

Motor housing 104 includes a motor cavity 133 and several passages for the flow of lubricating fluid and scavenged air. Induction motor 132 includes a stator 134 made up of copper wire windings and a rotor (laminate stack and windings) 136, all within motor cavity 133. The motor cavity 133 is configured to allow for the unobstructed rotation of the rotor 136 and shaft 114, and for the flow of ventilation air scavenged from the compressor.

Compressor housing 116 includes a fresh air intake 118, compressor rotor 119, a volute air passage 122 and a compressed air outlet 124.

Shaft 114 is mounted for rotation along its substantially vertically oriented axis on vertically aligned upper bearing 130 and lower bearing 128. Bearings 130 and 128 are lubricated by the lubrication system and are contained within oil reservoirs 144 and 145, respectively. Upper oil reservoir 144 is separated from turbine housing 102 by a seal 111 and from motor cavity 133 by a bushing 131. Lower oil reservoir 145 is the upper part of an oil sump 146 and is separated from compressor housing 116 by a lower compressor seal 121 and from motor cavity 133 by a bushing 129.

An oil inlet 138 is formed in the side of motor housing 104 and is in fluid communication with an upper oil passage 140 and a lower oil passage 142. Upper oil passage 140 extends upwards to allow the delivery of oil to upper bearing 130 at its upper bearing oil injection port 141. Lower oil passage 142 extends laterally through motor housing 104 towards lower bearing 128 to allow the delivery of oil to the lower bearing 128 at its lower bearing oil injection port 143.

Upper oil reservoir 144 is in fluid communication with drain passage 149 that is in turn connected to a drain outlet 148. At the lower end of the unit, lower oil reservoir 145 is in fluid communication with an oil sump 146 that is formed between motor housing 104 and compressor housing 116. Oil sump 146 is in fluid communication with a sump drain 147 that is connected to drain outlet 148.

Figure 2:
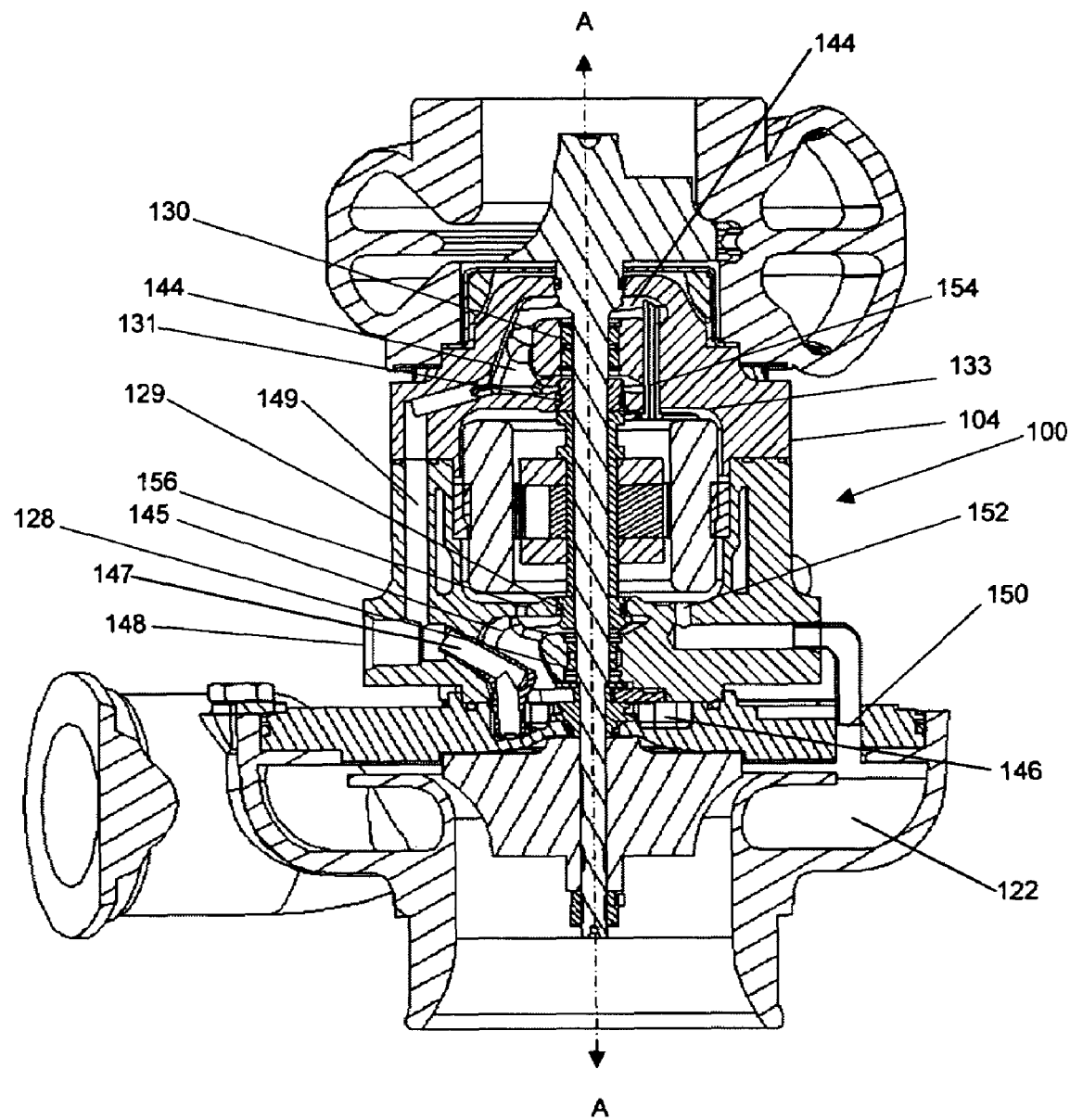
FIG. 2 is a 90 degree cross-sectional plan view of the embodiment shown in FIG. 1 taken along section line C-C in the top view diagram of FIG. 6.

In FIG. 2, a 90 degree cross-sectional plan view of the turbocharger embodiment shown in FIG. 1 is presented. This view is taken along the vertical axis A-A and section lines C-C as shown in the top view diagram of FIG. 6. The left side of FIG. 2 illustrates substantially the same components and features shown in FIG. 1, while the right side is a further 90 degree rotation as compared to FIG. 1 and shows the air injection portion of the lubricating system. A scavenged air inlet 150 is shown in communication with compressor volute passage 122. A scavenged air passage 152 is in fluid communication with air inlet 150 and opens into motor cavity 133. An air outlet passage 154 provides a path for air to flow from motor cavity 133 to upper oil reservoir 144. Another air outlet passage 156 is formed at the lower portion of motor cavity 133 (designated on the left side of FIG. 2) in fluid communication with lower oil reservoir 145 to allow for the scavenged air to escape from the motor cavity 133.

Figure 3:
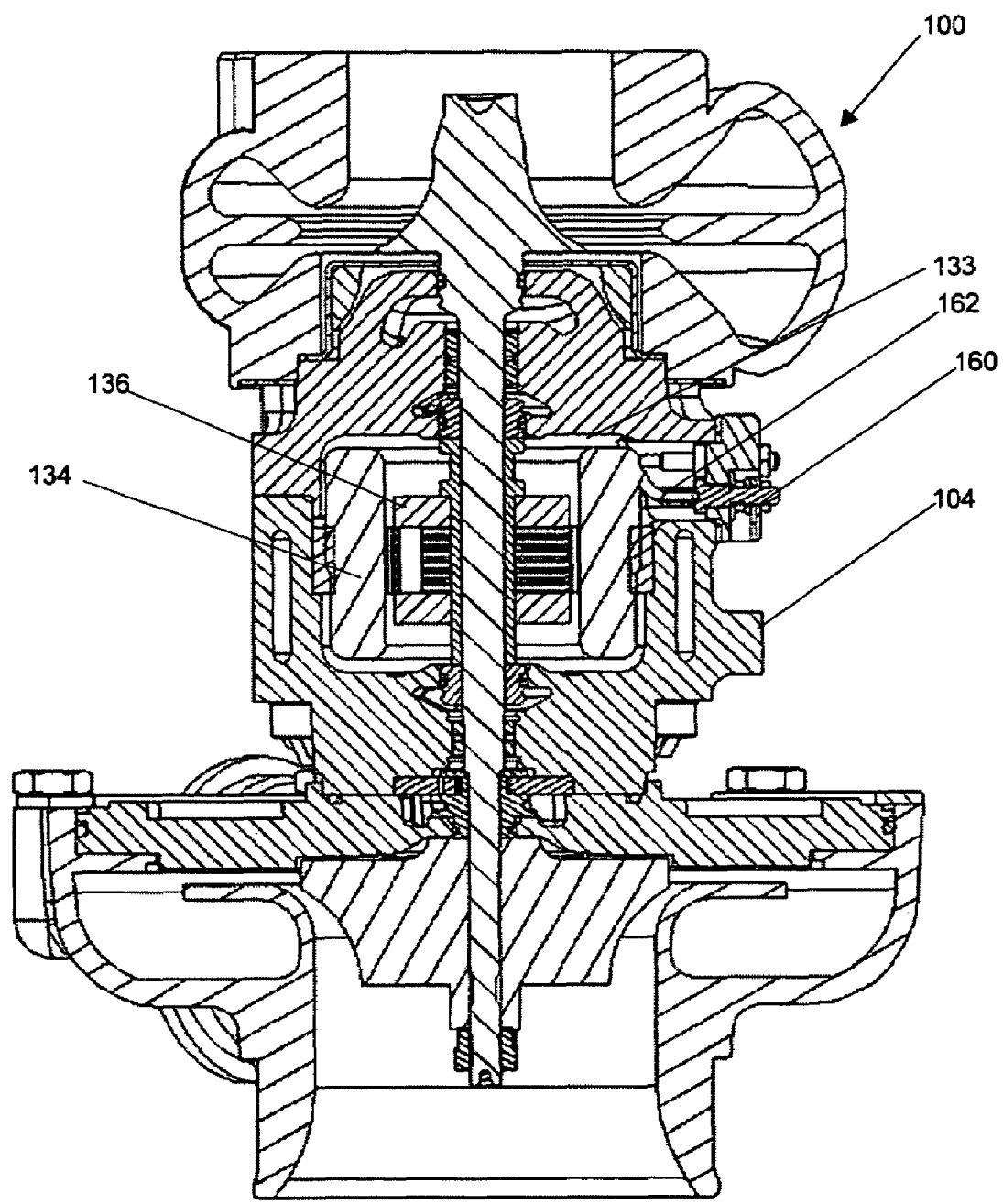
FIG. 3 is a cross-sectional plan view of the preferred embodiment shown in FIGS. 1 and 2, taken along plane section line D-D in FIG. 6.
Figure 6:
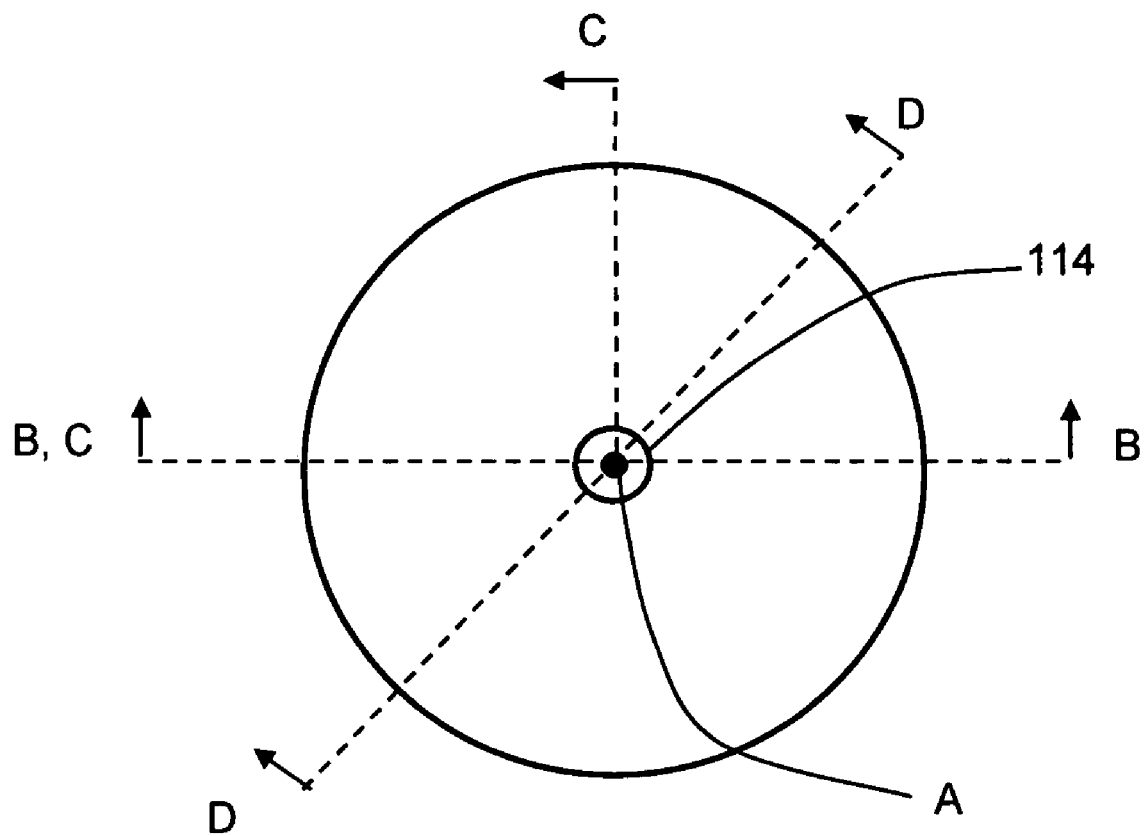
FIG. 6 is a top view diagram used to illustrate the various cross-sectional planes for views presented in FIGS. 1, 2 and 3.

In FIG. 3, another cross-sectional view is provided, as represented by section lines D-D in FIG. 6. In this FIG. 3, one of three electrical interconnections is illustrated for the turbocharger embodiment 100. The interconnection is between a stud terminal 160, mounted on motor housing 104, and stator windings 134 through a lead wire 162.

Figure 4:
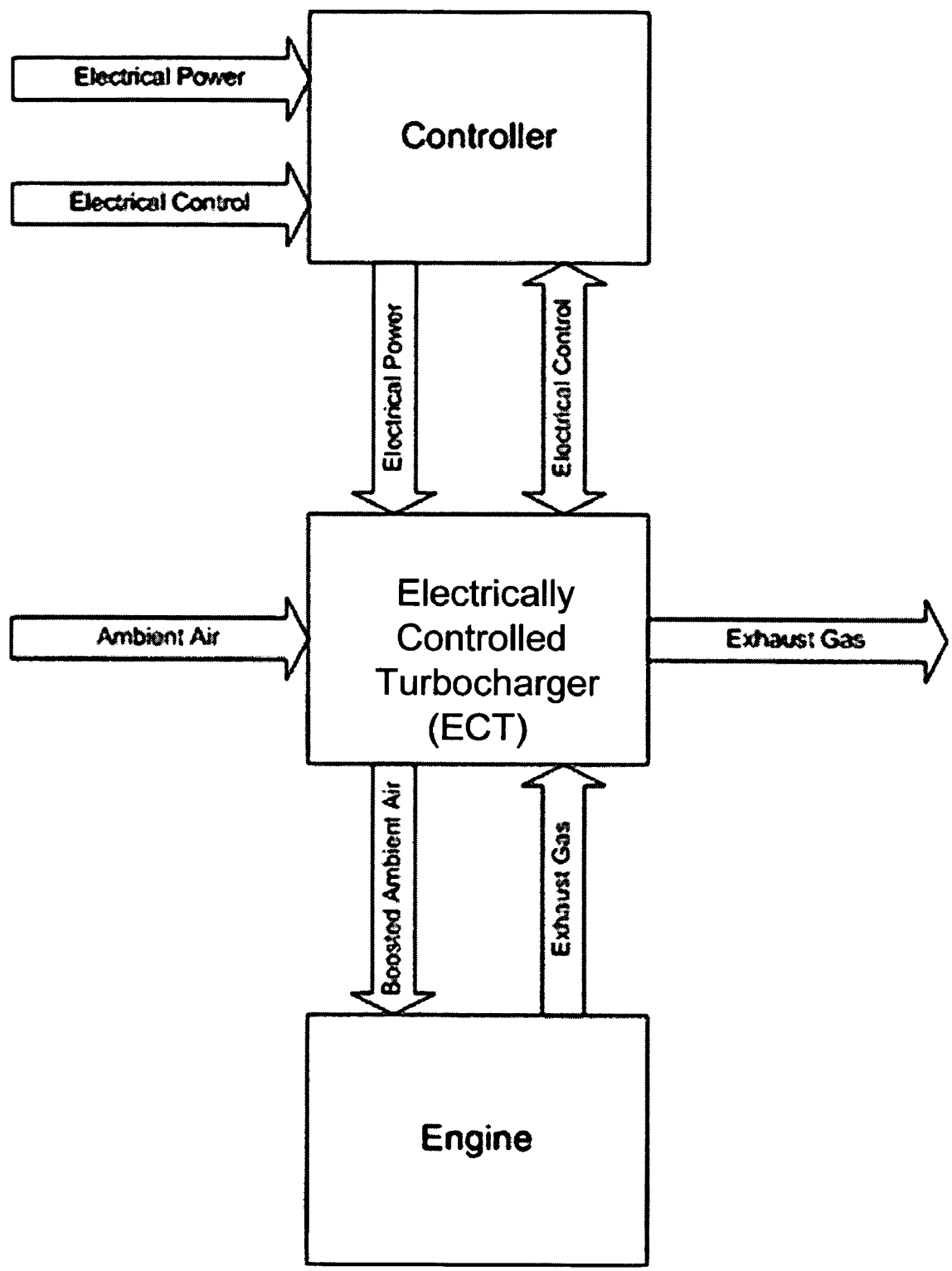
FIG. 4 is a block diagram showing the functional inputs and outputs for the electrically controlled turbocharger of the present invention.

In FIG. 4, the electrically controlled turbocharger is shown in its generic sense as receiving exhaust gas flowing from the associated engine and controlled electrical power from an associated controller. In this case, the controller provides alternating current or pulse width variable power to the electric induction motor to control its speed when required during cold start, other low idle conditions or acceleration demands in which the exhaust gas output from the engine is insufficient to cause the turbocharger to supply adequate amounts of fresh air to the intake manifold of the engine. As the engine increases its speed and produces more exhaust gas to drive the turbine, the controller responsively reduces power to the induction motor until the electric motor assist is no longer needed.

Figure 5:
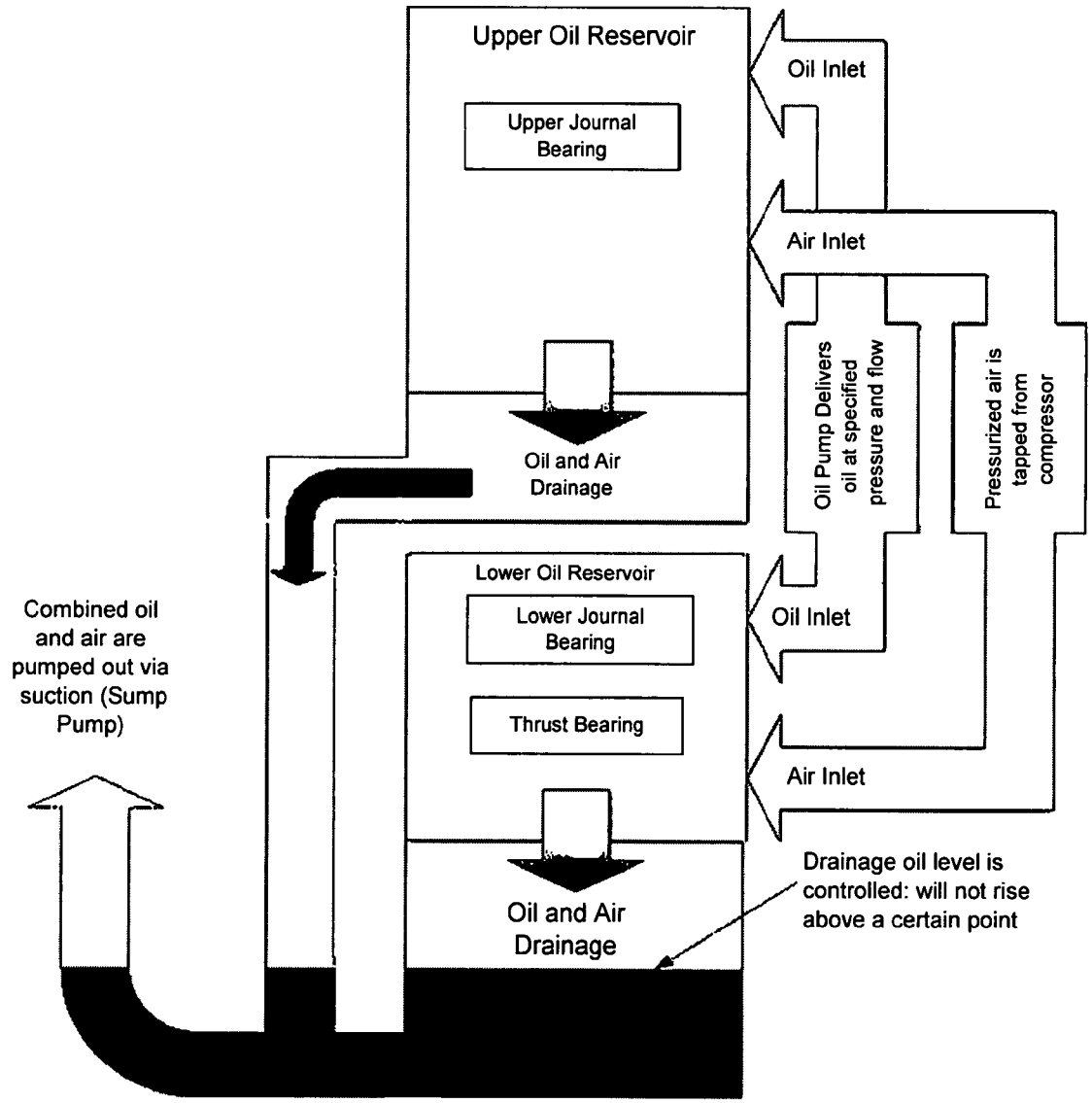
FIG. 5 is a block diagram showing the flow of air and lubricating fluid into and through an embodiment of the present invention.

The lubrication system of the preferred embodiment functions in accordance with the flow diagram of FIG. 5, with reference to the components shown in FIGS. 1 and 2. In this system, the oil is provided to oil inlet 138 from an auxiliary pump at a predetermined pressure and volume. It has been found that during cold starts or cold weather, the oil needs assistance to flow through the passages in an efficient manner. In addition, the location of the oil sump 146 at a level below the drain outlet requires positive pressure to keep the level below a predetermined level at all temperatures. The lubricating system utilizes pressurized scavenged air from compressor volute 122 to perform several tasks. First, the scavenged air flows into motor cavity 133 and provides a limited amount of ventilation to induction motor 132. Second, the air in motor cavity 133 creates a positive pressure against upper motor cavity bushing 131 and lower motor cavity bushing 129 to prevent oil in the opposing reservoirs from entering motor cavity 133. Third, as the air exits from motor cavity 133 through air outlet 154 and enters upper oil reservoir 144, it provides additional pressure to the oil that has entered that same reservoir to drive the oil into the drain passage 149. Fourth, the air that enters lower oil reservoir 145 from motor cavity 133 through air outlet 156 blows past the oil collected in the sump towards the drain oil outlet 148 and creates a vacuum. This vacuum in turn causes oil to be drawn from the sump and maintain the oil level therein at a desired level.

It should be understood that the foregoing description of the embodiments is merely illustrative of many possible implementations of the present invention and is not intended to be exhaustive.

We claim:

1. A turbocharger comprising:
 a turbine within a turbine housing configured to be rotationally driven by exhaust gases produced by an internal combustion engine;
 a compressor within a compressor housing configured to be rotationally driven by said turbine to supply compressed air to an internal combustion engine;
 a turbo shaft oriented along a substantially vertical axis interconnecting said turbine and said compressor to provide said rotational drive to said compressor along said substantially vertical axis;
 an induction motor within a motor housing located between said turbine and compressor housings configured to have a motor rotor integral with said turbo shaft to provide controlled auxiliary rotational driving force to said shaft and said compressor;
 said motor housing includes upper and lower bearings for mounting said turbo shaft for axial rotation,
 said motor housing contains oil flow passages within said motor housing for allowing the flow of lubricating oil from an oil inlet to an oil outlet and to lubricate said upper and lower bearings;
 said motor housing also contains a motor cavity which provides for unobstructed rotation of said motor rotor;
 said motor housing and said compressor housing further include an air scavenging passage between said compressor and said motor cavity to provide relatively cooled air scavenged under pressure from said compressor to ventilate said motor cavity;

said motor housing further contains an oil sump adjacent said lower bearing;

said oil flow passages are in communication with said oil sump and said sump is in communication with said oil outlet; and said motor housing contains a first outlet air passage in communication between said motor cavity and said oil sump to allow said scavenged air to escape said motor cavity and assist the removal of oil collected in said oil sump to said oil outlet.

2. A turbocharger as in claim 1, further comprising an upper oil reservoir adjacent said upper bearing in communication with said oil flow passage to said oil outlet; and said motor housing contains a second outlet air passage in communication between said motor cavity and said upper oil reservoir to allow said scavenged air to escape said motor cavity and assist the flow of oil from said upper oil reservoir, through said oil passage to said oil outlet.

3. A turbocharger comprising:

a turbine within a turbine housing configured to be rotationally driven by exhaust gases produced by an internal combustion engine;

a compressor within a compressor housing configured to be rotationally driven by said turbine to supply compressed air to an internal combustion engine;

a turbo shaft oriented along a substantially vertical axis interconnecting said turbine and said compressor to provide said rotational drive to said compressor along said substantially vertical axis;

an induction motor within a motor housing located between said turbine and compressor housings configured to have a motor rotor integral with said turbo shaft to provide controlled auxiliary rotational driving force to said shaft and said compressor;

said motor housing includes upper and lower bearings for mounting said turbo shaft for axial rotation;

said motor housing contains a motor cavity which provides for unobstructed rotation of said motor rotor;

said motor housing and said compressor housing further include an air scavenging passage between said compressor and said motor cavity to provide relatively cooled air to said motor cavity scavenged under pressure from said compressor to ventilate said motor;

said oil passages comprise a first oil passage that extends from said oil inlet to said an upper bearing and a second oil passage extends from said oil inlet to said lower bearing;

said motor housing also includes an upper reservoir in communication with said upper bearing and a lower reservoir in communication with said lower bearing, and oil from said upper bearing flows to said upper reservoir and from said lower bearing to said lower reservoir;

said motor housing further contains an oil sump adjacent said lower bearing and in communication to receive oil from said lower reservoir, said oil passages comprise a third oil passage that extends from said upper reservoir to said oil outlet; and a fourth oil passage that extends from said oil sump to said oil outlet; and said motor housing contains an outlet air passage in communication between said motor cavity and said sump to allow said scavenged air to escape said motor cavity under pressure and assist the forced removal of oil collected in said sump through said fourth oil passage and said oil outlet.

4. A turbocharger comprising:

a turbine within a turbine housing configured to be rotationally driven by exhaust gases produced by an internal combustion engine;

a compressor within a compressor housing configured to be rotationally driven by said turbine to supply compressed air to an internal combustion engine;

a turbo shaft interconnecting said turbine and said compressor to provide said rotational drive to said compressor along a vertical axis;

a motor housing containing a motor cavity between said turbine and said compressor;

said turbo shaft being mounted along a vertical axis in said motor housing by vertically aligned upper and lower bearings;

an induction motor within said motor housing, wherein said induction motor is configured to have a motor rotor and said motor rotor is fixedly mounted on said turbo shaft within said motor cavity for unobstructed rotation therein to provide controlled auxiliary rotational driving force to said shaft and said compressor;

an air scavenging passage extending between said compressor and said motor cavity to provide scavenged air under pressure to said motor cavity said motor housing also containing an oil inlet, an oil outlet, an oil sump adjacent said lower bearing, and oil flow passages that provide lubricating oil flow paths from said oil inlet to said upper and lower bearings and to said sump for allowing the flow of lubricating oil from said oil inlet to lubricate said upper and lower bearings and to flow to said sump and said oil outlet; and said motor housing contains a first outlet air passage in communication between said motor cavity and said sump to allow said scavenged air to escape said motor cavity and assist the removal of oil collected in said sump to said oil outlet.

5. A turbocharger as in claim 4, wherein said scavenged air in said motor cavity under pressure from said compressor functions to keep lubricating oil from migrating into said motor cavity.

6. A turbocharger as in claim 4, further comprising an upper oil reservoir adjacent said upper bearing in communication with said oil flow passage to said oil outlet; and said motor housing contains a second outlet air passage in communication between said motor cavity and said upper oil reservoir to allow said scavenged air to escape said motor cavity and assist the flow of oil from said upper oil reservoir, through said oil passage to said oil outlet.

* * * * *